(12) United States Patent
Schwartz et al.

(10) Patent No.: US 7,876,926 B2
(45) Date of Patent: Jan. 25, 2011

(54) LANE MARKER DETECTION AND FITTING METHODS

(75) Inventors: David A. Schwartz, Moorpark, CA (US); Jan K. Schiffmann, Newbury Park, CA (US); Lisa R. Hamilton, Simi Valley, CA (US)

(73) Assignee: Delphi Technologies, Inc., Troy, MI (US)

( * ) Notice: Subject to any disclaimer, the term of this patent is extended or adjusted under 35 U.S.C. 154(b) by 1095 days.

(21) Appl. No.: 11/592,824

(22) Filed: Nov. 3, 2006

(65) Prior Publication Data

US 2008/0109118 A1 May 8, 2008

(51) Int. Cl.
*G05D 1/00* (2006.01)
*G06K 9/00* (2006.01)

(52) U.S. Cl. .......................................... 382/104; 701/1
(58) Field of Classification Search ................. 382/104; 701/1, 300
See application file for complete search history.

(56) References Cited

U.S. PATENT DOCUMENTS

| | | | | |
|---|---|---|---|---|
| 5,832,138 | A * | 11/1998 | Nakanishi et al. | 382/281 |
| 5,986,279 | A * | 11/1999 | Dewaele | 250/582 |
| 6,254,259 | B1 * | 7/2001 | Kobayashi | 362/465 |
| 6,263,089 | B1 * | 7/2001 | Otsuka et al. | 382/107 |
| 6,591,000 | B1 * | 7/2003 | Oike et al. | 382/104 |
| 7,034,742 | B2 * | 4/2006 | Cong et al. | 342/70 |
| 2002/0080019 | A1 * | 6/2002 | Satoh et al. | 340/436 |
| 2004/0212680 | A1 * | 10/2004 | Schroeder et al. | 348/188 |
| 2005/0228587 | A1 * | 10/2005 | Kobayashi et al. | 701/300 |

FOREIGN PATENT DOCUMENTS

| | | |
|---|---|---|
| EP | 0341985 | 11/1989 |
| EP | 0827127 | 3/1998 |
| JP | 09-198505 | * 1/1996 |
| JP | 09198505 | 7/1997 |

OTHER PUBLICATIONS

European Search Report dated Jun. 2, 2009.
Bertozzi M et al: "Gold: A Parallel Real-Time Stereo Vision System for Generic Obstacle and Lane Detection"; IEEE Transactions on Image Processing IEEE Service Center, Piscataway, NJ, US, vol. 7, No. 1; Jan. 1, 1998, pp. 62-80, XP000727376; ISSN: 1057-7149.

* cited by examiner

*Primary Examiner*—Vu Le
*Assistant Examiner*—Amara Abdi
(74) *Attorney, Agent, or Firm*—Jimmy L. Funke (57) ABSTRACT

A method of lane marker detection and detection fitting is provided for lane tracking. A lane marker is modeled and split into left and right steps. A filter response is calculated from a cumulative row sum, and normalized for filter pixel size, lane marker brightness and road brightness. A lane marker response is peak detected for positive and negative peaks and checked for having a magnitude above a threshold and being a local peak in a five point neighborhood. A Hough transform is extended to multiple planes to use lane marker features to determine a best line. Lane marker features include a mean and variance of lane marker brightness, lane marker width, lane marker parallelism to a host vehicle direction of travel, and consistence with a predicted lane marker characteristic. A closest lane marker line to a host vehicle is identified, and refitted to account for any curvature.

21 Claims, 6 Drawing Sheets

LEFT STEP MATCHED FILTER          RIGHT STEP MATCHED FILTER

PARAMETER SPACE PLOT

FIG. 7

PARAMETER SPACE PLOT OF FOUR NOISY
MEASUREMENTS OF POINTS ON A LINE

LANE MARKER DETECTION AND FITTING METHODS

FIELD OF THE INVENTION

The invention relates generally to lane tracking for vehicle safety and other applications, and more particularly to lane marker detection and fitting a straight or curved lane marker to a collection of potential lane marker objects in a camera image.

BACKGROUND OF THE INVENTION

Automated safety features for motor vehicles have been proposed and developed in recent years. Vision based lane tracking systems have been designed that are supposed to monitor a vehicle position by imaging a roadway and detecting lane markers. These lane tracking systems can be used for lane departure warning, or in more advanced systems may even be used for lane keeping assistance or automated vehicle guidance systems. In such lane tracking systems, a camera captures images of a roadway in front of a vehicle and imaging processing software identifies the lane markers from the roadway. The vision system can then determine the vehicle position relative to the lane markers, for displaying vehicle positioning information to a driver, warning a driver of an unintended lane departure, detecting driving patterns such as those indicative of a drowsy driver, or use in a collision warning/avoidance system. Conventional image processing systems are advancing in capabilities and provide an opportunity for improving vehicle occupant safety and vehicle guidance.

For such lane tracking systems to be effective for vehicle occupant safety, vehicle guidance or other applications, it is important that the lane tracking be effective under most if not all conditions that are encountered in real world applications. However, this is very difficult in practice. For example, a variety of lighting conditions commonly occur that make it much more difficult for an imaging system to accurately determine lane markers and vehicle position. One example of a common difficult imaging condition is bright sunlight where the glare off a tar seam can emit a brighter image than a true lane marker. These common conditions can continue for a considerable time, necessitating lane tracking systems to consider various road conditions.

Prior approaches to lane imaging under complicated but common lighting conditions have attempted to increase the sophistication of the imaging devices. Sophisticated cameras and sophisticated image processing algorithms have been proposed to increase the ability of the imaging system to detect the lane markers despite the poor image quality. Such approaches to solving the problem are complex and have proven costly, in both design and implementation.

One-dimensional detection of lane marker-like features must take into account complicating real world considerations including shadows, skid marks, patching or paving seams, faded markers, yellow on concrete, low sun angles, etc. Accordingly, a need exists for accurate lane marker detection and lane fitting in a roadway under a variety of complicated conditions including lighting conditions, road clutter/marks and irregular lane markers, for vehicle occupant safety and other applications.

SUMMARY OF THE INVENTION

The present invention provides a method of detecting and modeling a lane marker. In an embodiment, a lane marker is modeled in one dimension as a bright marker on a relatively darker road, having an unknown width in the range of a minimum marker width to a maximum marker width. A lane marker model is split into a left step and a right step, wherein the right step is a negative value of a value of the left step. A cumulative row sum is calculated from the lane marker model. A matched filter response is calculated from the cumulative row sum, and the matched filter response is normalized by compensating for filter size by dividing the matched filter response by a sum of an absolute value of a matched filter coefficient. The matched filter response is also normalized by compensating for illumination by normalizing for illumination of apparent brightness of the lane marker and brightness of a road on which the lane marker is located. Normalizing for apparent brightness of the lane marker is achieved by dividing the normalized matched filter response by a bright section measurement of the matched filter response to obtain an illumination normalized response. Normalizing for the brightness of the road is achieved by defining an "inside neighborhood," as described infra.

A lane marker matched filter response is peak detected for both positive and negative peaks. In an embodiment, to be considered a peak, a lane marker response has a magnitude above a threshold and is a local peak in a five point neighborhood centered about a point, as described infra. Thresholding is based on measurements from collected road images and is based on two tests. A normalized difference between a left and a right side has a magnitude above a threshold that is a function of estimated illumination, and the average brightness of the brighter side, presumed to be a lane marker, is brighter than an inside neighborhood brightness (road without a lane marker). The present also provides efficient algorithms to match "best" left and right edge detections of a potential marker detection. A minimum lane marker width and a maximum lane marker width are also transformed to a width in pixels for each row of an image.

The present invention also provides a method of fitting a lane marker to a collection of one-dimensional detection of potential lane marker objects, for lane tracking. A Hough transform is utilized to determine a line fit of the lane marker. The Hough transform is extended to multiple planes to use lane marker features to determine a "best line" or curve. A "best line" means that a true lane marker is better than a grind mark, paving seam, tar patch, skid mark, etc. The lane marker features include a mean and variance of at least one of lane marker brightness, lane marker width, lane marker parallelism to a host vehicle direction of travel, and consistence with a predicted lane marker characteristic.

In an embodiment, the extension of the Hough transform to multiple planes is performed prior to a selection of a best line, wherein accumulated values in a Hough plane bin are modified to account for a preferred lane marker feature. The accumulated values in the Hough plane bin are modified by generating a value in a plurality of auxiliary planes' bins to the Hough plane bin (wherein the generated value represents a characteristic of the lane marker), assigning a penalty factor to the auxiliary plane bin reflecting an extent to which the auxiliary plane bin value varies from the preferred lane marker feature, and multiplying the penalty factor to the Hough plane bin to generate a modified Hough plane bin.

Additionally, a closest lane marker line to the host vehicle is identified from a plurality of lane marker lines situated adjacent to the host vehicle. Substantially parallel lane marker lines are identified from the plurality of lane marker lines, measured from a maximum predetermined lane marker distance from the host vehicle to the host vehicle. A threshold peak is identified within a five-point neighborhood (described infra), situated closest to the host vehicle, from the substantially parallel lane marker lines.

To account for at least one of a vertical curvature and a horizontal curvature of the lane marker line, the present invention further determines a refitted lane marker line. The points corresponding to the Hough transform lane marker line are also refitted with a weighted least squares fit.

Other features and advantages of this invention will be apparent to a person of skill in the art who studies the invention disclosure. Therefore, the scope of the invention will be better understood by reference to an example of an embodiment, given with respect to the following figures.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE INVENTION

Exemplary embodiments are described with reference to specific configurations. Those of ordinary skill in the art will appreciate that various changes and modifications can be made while remaining within the scope of the appended claims. Additionally, well-known elements, devices, components, methods, process steps and the like may not be set forth in detail in order to avoid obscuring the invention. Further, unless indicated to the contrary, the numerical values set forth in the following specification and claims are approximations that may vary depending upon the desired characteristics sought to be obtained by the present invention.

A method and system is described herein for providing lane marker detection and modeling, and fitting a straight or curved lane marker to a collection of potential lane marker objects in a camera image, for vehicle occupant safety and other applications. The present invention takes into account complicating real world considerations including lighting conditions, low sun angles, shadows, skid marks, patching or paving seams, irregular lane markers, faded markers, lane marker curvature, etc.

Split Lane Marker Detection

Figure 1A:
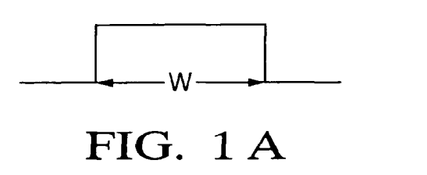
FIG. 1A is a diagrammatic view of a lane marker model illustrating the width W, right edge and left edge, in which the present invention can be useful.
Figure 1B:
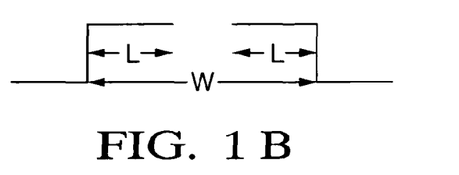
FIG. 1B is a diagrammatic view of the lane marker model as in FIG. 1A split into a left step and a right step, in accordance with an embodiment of the present invention.

Referring to the drawings wherein identical reference numerals denote the same elements throughout the various views, FIG. 1A and FIG. 1B illustrate a lane marker model and a split lane marker model, respectively. In an embodiment of the invention, lane marker detection is modeled as a row-by-row, one-dimensional detection process. Other embodiments include modeling the lane marker detection consecutively or non-consecutively (processing only the even or odd numbered rows), modeling by column, and in two dimensions. In another embodiment, the lane marker detection is modeled as a one-dimensional line at a rational slope having n rows/m columns. For each row, the lane marker is modeled as a bright bar on a relatively dark background having an unknown width W, in the range of a minimum marker width to a maximum marker width, since lane widths vary from place to place.

Figure 2A:
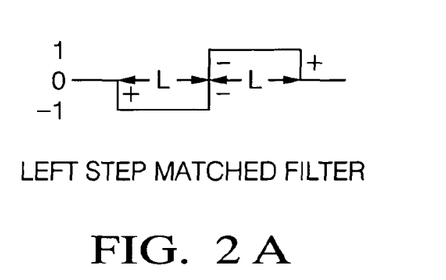
FIG. 2A is a diagrammatic view illustrating a matched filter for the left step edge of the split lane marker model as in FIG. 1B, in accordance with an embodiment of the present invention.
Figure 2B:
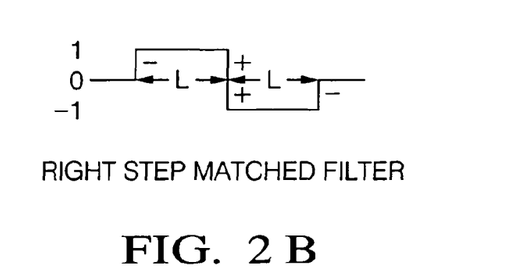
FIG. 2B is a diagrammatic view illustrating a matched filter for the right step edge of the split lane marker model as in FIG. 1B, in accordance with an embodiment of the present invention.

The lane marker model is split into a left step and a right step, avoiding the need to compute matched filters for all possible marker widths. The matched filters for the left edge and the right edge are shown in FIG. 2A and FIG. 2B, respectively. The right step filter is a negative version of the left step filter, and thus in an embodiment, only the left step filter response is calculated.

$L_{min}$ is defined as the minimum lane marker width, and $L_{max}$ is defined as the maximum lane marker width. $L_{min}$ is a function of the position in the image. It is the width in pixels of the minimum lane marker width in the world perspective transformed into the image plane. If the camera roll and pan angles are small, $L_{min}$ can be approximated as a function of the image row.

When the matched filter has coefficients of +1 and −1, a calculation based on computing the cumulative row sum s for the row and then the matched filter response can be determined at each index point along the row with adds and/or subtracts.

In equation 1, let p be the starting index column of the region of interest for row m. The image pixel in row m, column k is $x_{mk}$. Given an eight bit intensity image then $0 \leq x_{mk} \leq 255$. Then the row cumulative sum is:

$$s_k = \sum_{i=p}^{k} x_{mi} \qquad \text{(Equation 1)}$$

Un-normalized Filter Responses

The un-normalized left step filter responses (f̃) are:

$$\tilde{f}_k = \tilde{f}_{right_k} - \tilde{f}_{left_k} \qquad \text{(Equation 2)}$$

where $$\tilde{f}_{left_k} = s_k - s_{k-L_{min}} \text{ and } \tilde{f}_{right_k} = s_{k+L_{min}} - s_k \qquad \text{(Equation 3)}$$

$\tilde{f}_k$ is independent of p for all $p \leq k - L_{min}$.

Scale Normalized Filter Responses

The matched filter response is normalized to compensate for the effective pixel scale size of the filter and for the effects of illumination. The closer markers appear larger and thus utilize more pixels as compared to distant markers. To normalize for the effective pixel scale the result is divided by the sum of the absolute value of the matched filter coefficients ($\frac{1}{2}L_{min}$). It is to be appreciated that the factor 2 of the matched filter coefficient can vary as long as the scale transforms produce the same relative value. As an example, FIGS. 2A and 2B show 2L pixels, so it is normalized by 2L.

The scale normalized left step filter response f is:

$$f_k = f_{right_k} - f_{left_k} \qquad \text{(Equation 4)}$$

where $$f_{left_k} = \frac{\tilde{f}_{left_k}}{2L_{min}} = \frac{s_k - s_{k-L_{min}}}{2L_{min}} \text{ and}$$

$$f_{right_k} = \frac{\tilde{f}_{right_k}}{2L_{min}} = \frac{s_{k+L_{min}} - s_k}{2L_{min}} \qquad \text{(Equation 5)}$$

Normalizing for Apparent Brightness of the Lane Maker

The apparent brightness of the lane marker is approximated as a product of the illumination and the object reflectance. The filter output is proportional to the apparent brightness. In an embodiment of the invention, to account for lighting and camera exposure differences, the relative illumination based on the bright part of the filter response is estimated.

$f_{dark_k} = \min(f_{right_k}, f_{left_k})$ is the dark filter response, and $f_{bright_k} = \max(f_{right_k}, f_{left_k})$ is the bright filter response.

The illumination normalized response (z) is:

$$z_k = \frac{f_{right_k} - f_{left_k}}{f_{bright_k}} \qquad \text{(Equation 6)}$$

Normalizing for Apparent Brightness of the Road by Defining an Inside Neighborhood The apparent brightness of the road (not including the marker portion) is also approximately determined. As an example, the width of the inside neighborhood is defined as about 0.4 meters to 0.8 meters from an edge of the lane marker toward the image center. The image center is frequently near the center of a lane, wherein a typical lane is about 3.5 meters wide. This definition takes into account that true lane markers are likely to be an approximate distance outside of the image center, and the region toward the image center is likely to be the road.

If the possible lane marker is left of the image center; if column k<center column index (or the column index of the focus of expansion):

$$w_k = \frac{s_{k+L_{inside}} - s_{k+L_{max}}}{L_{inside} - L_{max}}. \qquad \text{(Equation 7)}$$

$$\text{Otherwise, } w_k = \frac{s_{k-L_{max}} - s_{k-L_{inside}}}{L_{inside} - L_{max}}. \qquad \text{(Equation 8)}$$

$W_k$ is defined as an observed road brightness. $L_{inside}$ is a predetermined width from an outer edge of the lane marker toward an image center. $L_{max}$ is a filter pixel scale width of a maximum real world width of the lane marker.

Peak Detection

The lane marker response is also peak detected for both positive and negative peaks. Positive peaks correspond to left lane marker edge locations, and negative peaks correspond to right lane marker edge locations. In an embodiment, to be declared a peak, the lane marker response must be above a threshold and must be a local peak in a five point neighborhood centered about a point. The five point neighborhood is defined in either Equations 10A or 10B.

Thresholding is defined herein as an ad-hoc technique based on measurements from collected road images and based on two tests, shown in equation 9A. The first threshold test requires that a normalized difference between the left and right side have a magnitude above a threshold that is a function of estimated illumination. The second threshold test requires that the average brightness of the brighter side, presumed to be a marker, is brighter than the inside neighborhood brightness. The inside neighborhood is defined as road but not lane marker.

An alternative form of the second threshold test is to compare to a threshold that is the mean divided by the inside threshold plus some predetermined constant times the standard deviation divided by the inside neighborhood.

If Equation 9A is true (using the definitions 9B and 9C), then the response at k is considered above threshold.

$$|Z_k| > \tau_1(f_{bright_k}) \text{ and } f_{bright_k} > \tau_2(w_k) \qquad \text{(Equation 9A)}$$

The thresholding functions shown in Definitions 9B and 9C were experimentally determined by measured roadway images collected with a CMOS camera taken through an automobile windshield. The following experimental result examples are provided for illustrative purposes and are not intended to be limiting.

$$\tau_1(f_{bright_k}) \equiv \min\left(13\left(1 + \frac{255 - f_{bright_k}}{255}\right), 0.3 f_{bright_k}\right) \quad \text{(Definition 9B)}$$

$$\tau_2(w_k) = \min(1.05 \, w_k, 250) \quad \text{(Definition 9C)}$$

Figure 3:
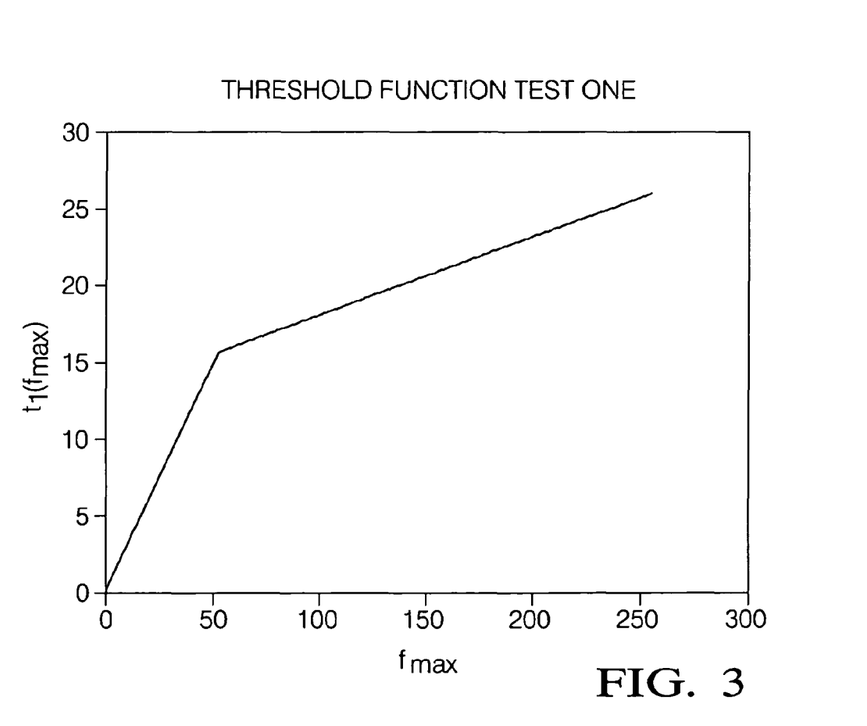
FIG. 3 is a graphical illustration of a threshold test based on brightness of an estimated illumination between a left step and a right step, in accordance with an embodiment of the present invention.
Figure 4:
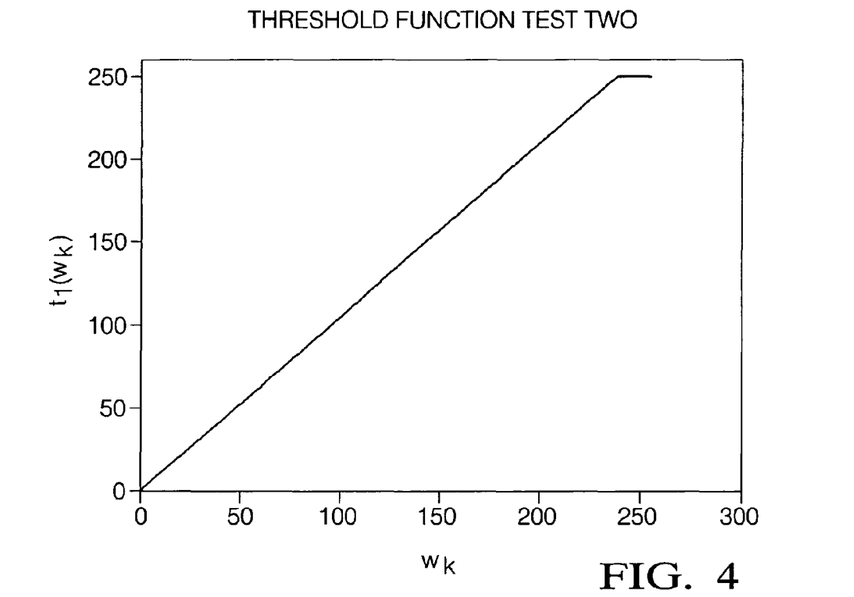
FIG. 4 is a graphical illustration of a threshold test based on brightness of a road inside neighborhood, in accordance with an embodiment of the present invention.

FIG. 3 illustrates a graphical representation of the first threshold test with applied Definition 9B. FIG. 4 illustrates a graphical representation of the second threshold test with applied Definition 9C.

Local Peak

A peak is defined herein as being based on a five point neighborhood, as shown in Equations 10A and 10B. The fifth point is point $Z_k$.

If $Z_k > 0$ (for positive peaks)

$$Z_{k-2} < Z_k \text{ and } Z_{k-1} \leq Z_k \text{ and } Z_{k+1} \leq Z_k \text{ and } Z_{k+2} < Z_k \quad \text{(Equation 10A)}$$

Else (for negative peaks)

$$Z_{k-2} > Z_k \text{ and } Z_{k-1} \geq Z_k \text{ and } Z_{k+1} \geq Z_k \text{ and } Z_{k+2} > Z_k \quad \text{(Equation 10B)}$$

If the threshold condition and the local peak condition at pixel k are true (as described supra), then k is declared an edge location.

Marklets

A marklet as defined herein is a potential lane marker detection characterized by a left edge peak point followed by a matching right edge peak point, whose width is in the range of a minimum maker width to a maximum marker width. Marklets are represented herein by their center position, width, and pixel intensity at their center position. Lane markers are often imperfect and may be dirty, have smudged edges and are frequently painted misaligned on top of old lane markers.

Figures 5, 6:
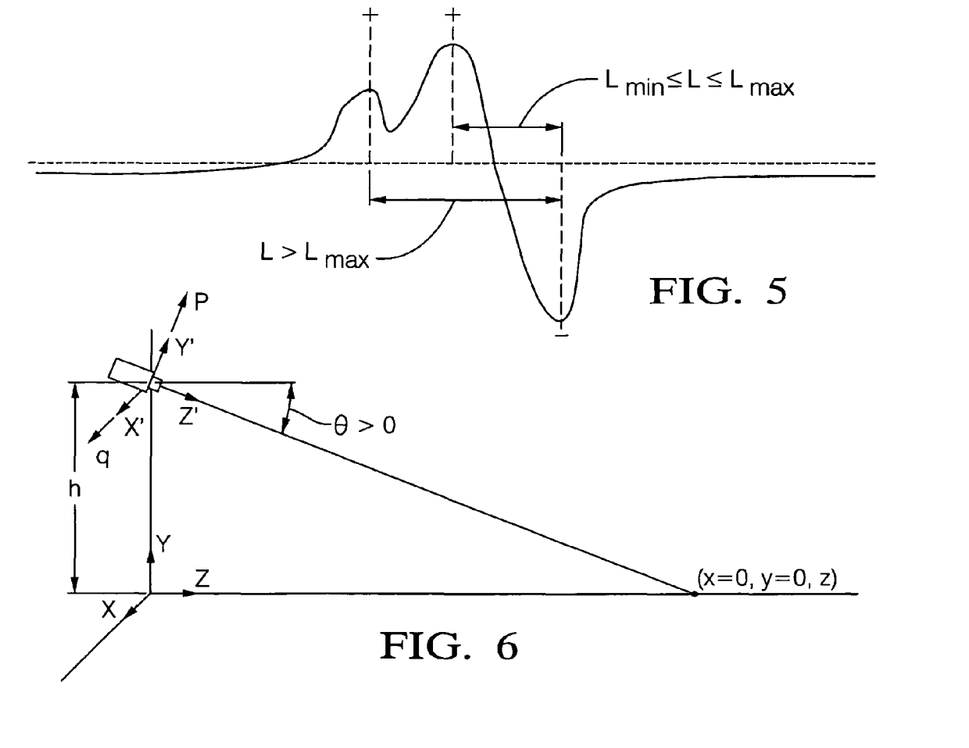
FIG. 5 is a graphical illustration of a normalized lane marker detector response showing left and right edges within an accepted lane width, and left and right edges greater than an accepted lane width, in accordance with an embodiment of the present invention.
FIG. 6 is a graphical illustration of a tilt only perspective transform model, in accordance with an embodiment of the present invention.

An example of this is illustrated in FIG. 5 wherein a left edge is indicated by a plus sign and a right edge is indicated by a negative sign. The leftmost edge, when paired with the right edge, presents a marker width that is greater than a predetermined maximum marker width. The remaining left edge, when paired with the right edge, presents a marker width that is between a minimum marker width and a maximum marker width.

In an embodiment, the present invention detects the best set of marklets by considering all possible valid pair edge combinations and then pairs the best fitting edges. Edges are paired by preferring edges with the strongest edge strength. When scanning from left to right, for successive left edges without intervening right edges, the edge with the maximum illumination normalized response (the absolute value of $Z_k$) is selected. In another embodiment, when scanning from right to left, for successive right edges without intervening left edges, the edge with the maximum illumination normalized response is selected.

Left and right edge peaks are combined into a set of marklets, by utilizing the following described methods. In one embodiment, all combinations of a left edge followed by a right edge are considered, having a width within the allowed minimum maker width to the allowed maximum marker width. In another embodiment, all combinations of a left edge followed by a right edge are considered, having a width within the allowed minimum maker width to the allowed maximum marker width, and then resolving which of the sets of pair-wise overlapped possible marklets is best with a combinatorial optimization technique. In a further embodiment, left and right edge peaks are paired by a greedy scan (greedy matching described infra) from left to right (or right to left) pairing the first encountered and valid non-overlapping marklets. In a further embodiment, a maximal left edge peak and a maximal right edge peak are paired (strongest edge matching described infra).

Greedy Matching:

The scanning first seeks a left edge peak. After a left edge peak is detected, the scanning seeks a right edge peak. The scanning distance extends from a minimum predetermined lane marker width distance to a maximum predetermined lane marker width distance, wherein the minimum predetermined lane marker width distance and the maximum predetermined lane marker width distance are measured from the left edge peak. Next, a marklet position is defined midway between the left edge peak and the right edge peak. If no matching right edge peak is detected, then the scanning seeks an alternate left edge peak from beyond the first left edge peak. An alternate right edge peak is then scanned from the minimum predetermined lane marker width distance to the maximum predetermined lane marker width distance, measured from the alternate left edge peak. An alternate marklet position is then defined midway between the alternate left edge peak and the alternate right edge peak. Also, the lane marker is modeled by at least one of row, column, one-dimension, two dimensions, consecutively, and non-consecutively.

When a left edge peak and a right edge peak are matched, then adjacent lane markers can further be determined. The scanning seeks a second left edge peak from beyond the previously matched first right edge peak. After a second left edge peak is detected, the scanning seeks a second right edge peak that matches the second left edge peak. The scanning distance extends from a minimum predetermined lane marker width distance to a maximum predetermined lane marker width distance, wherein the minimum predetermined lane marker width distance and the maximum predetermined lane marker width distance are measured from the second left edge peak. Next, a second marklet position is defined midway between the second left edge peak and the second right edge peak. If no matching second right edge peak is detected, then the scanning seeks an alternative left edge peak from beyond the second left edge peak. Additionally, the scanning for the second left edge peak, the scanning for the second right edge peak, and the defining the second marklet position are iterative to define subsequent marklet positions.

Strongest Edge Matching:

The scanning seeks a first left edge peak (called a current position), and then seeks successive left edge peaks until an intervening right edge peak is found. Next, the left edge peak having a maximum illumination normalized response magnitude (maximal left edge), is identified from the left edge peaks. After a maximal left edge peak is detected, the scanning seeks at least one right edge peak. The scanning distance extends from a minimum predetermined lane marker width distance to a maximum predetermined lane marker width distance, wherein the minimum predetermined lane marker width distance and the maximum predetermined lane marker width distance are measured from the maximal left edge. Next, a maximal right edge, having a maximum illumination normalized response magnitude, is identified from the right edge peaks. A marklet position is then defined midway between the maximal left edge and the maximal right edge.

If no matching right edge peak is detected, then the scanning seeks alternative left edge peaks from beyond the maximal left edge. The scanning seeks successive left edge peaks until an intervening right edge peak is found. The left edge peak having a maximum illumination normalized response magnitude (alternative maximal left edge), is identified from the left edge peaks. The scanning then seeks at least one right edge peak, extending from a minimum predetermined lane marker width distance to a maximum predetermined lane marker width distance, measured from the alternative maximal left edge. Also, the lane marker is modeled by at least one of row, column, one-dimension, two dimensions, consecutively, and non-consecutively.

When a left edge peak and a right edge peak are matched, then adjacent lane markers can further be determined. The scanning seeks the next second left edge peak beyond the matched right edge peak (the second left edge peak is now designated as the current position), and then seeks successive left edge peaks until an intervening right edge peak is found. Next, the left edge peak having a maximum illumination normalized response magnitude (second maximal left edge), is identified from the left edge peaks. After a second maximal left edge peak is detected, the scanning seeks at least one right edge peak. The scanning distance extends from a minimum predetermined lane marker width distance to a maximum predetermined lane marker width distance, measured from the second maximal left edge. Next, a second maximal right edge, having a maximum illumination normalized response magnitude, is identified from the right edge peaks. A second marklet position is then defined midway between the second maximal left edge and the second maximal right edge. Additionally, the scanning for the second left edge peak, the scanning for the second right edge peak, and the defining the second marklet position are iterative to define subsequent marklet positions.

In other embodiments, for both Greedy matching and Strongest Edge matching, the scanning seeks lane markers from right to left, or along a straight line in the image with the line at a predetermined slope (i.e., 45 degree line and or −45 degree line). Further, it is to be appreciated that although the description above describes scanning in the order from a left edge to a right edge, alternatively the scanning order may be from a right edge to a left edge.

Marker Width

The minimum and the maximum lane marker widths (typically 0.08 m to 0.42 m) are transformed to pixel width for each row of an image. By setting the camera pan and roll angles small (less than 3 degrees), a sufficiently accurate marker width in pixels is obtained with a tilt only perspective model, which leads to a simplified calculation of pixel width.

Definitions are presented herein for the following:
h is camera height (m).
θ is tilt down angle (radians).
f is focal length in pixels.
(P, Q) are row, column image coordinates; (0, 0) is the upper left corner.
(p, q) are row, column image coordinates; (0, 0) is the center of the image plane, p>0 is above the center, q>0 is to the right of the center.
$P_\infty$ is a horizon row.
$P_0$ is an image plane center row coordinate.
$Q_0$ is an image plane center column coordinate.
(x, y, z) are world coordinates (illustrated in FIG. 6).

FIG. 6 illustrates a tilt only perspective transform model.

Mapping from (p, q) to (P, Q)

$P = P_0 - p$ $Q = Q_0 + q$ (Equation 11)

Horizon Row $P_\infty = f \tan \theta$ $P_\infty = P_0 - p_\infty$ (Equation 12)

Perspective Transform $$\begin{bmatrix} x' \\ y' \\ z' \end{bmatrix} = \begin{bmatrix} 1 & 0 & 0 \\ 0 & \cos\theta & \sin\theta \\ 0 & -\sin\theta & \cos\theta \end{bmatrix} \begin{bmatrix} x \\ y - h \\ z \end{bmatrix}$$ (Equation 13)

This can be re-written as $x' = x$ $y' = y \cos\theta - h \cos\theta + Z \sin\theta$ $Z' = -y \sin\theta + h \sin\theta + Z \cos\theta$ (Equation 14)

Applying the pin-hole camera perspective transformation $$p = f \frac{y'}{z'} = f \frac{-(h-y)\cos\theta + z\sin\theta}{(h-y)\sin\theta + z\cos\theta}$$ (Equation 15)

$$q = f \frac{x'}{z'} = f \frac{x}{(h-y)\sin\theta + z\cos\theta}$$

The inverse transform for y=0 is:

$$z = h \frac{p\sin\theta + f\cos\theta}{f\sin\theta - p\cos\theta}$$ (Equation 16)

$$x = h \frac{q}{f\sin\theta - p\cos\theta}$$

Given row p, and x, we can solve for q.

$$z = h \frac{p\sin\theta + f\cos\theta}{f\sin\theta - p\cos\theta}$$ (Equation 17)

$$q = f \frac{x}{(h-y)\sin\theta + z\cos\theta}$$

Let y=0, x=1 m, and row p=0. Then the width in pixels for 1 m in row p=0 (and column q=0) [(P=P_0, Q=Q_0)] is:

$$\rho_{1,0} = \frac{f}{h\sin\theta + z\cos\theta} = \frac{f}{h\sin\theta(1 + \cot^2\theta)}$$ (Equation 18)

Since the width in pixels is proportional to the row distance to the horizon row, the width in pixels for a marker of width w(m), for row P is:

$$\rho = w \cdot \frac{(P - P_\infty)}{(P_0 - P_\infty)} \cdot \frac{f}{h\sin\theta(1 + \cot^2\theta)} \quad \text{(Equation 19)}$$

Let $$\eta = \frac{f}{h\sin\theta(1 + \cot^2\theta)(P - P_\infty)} \quad \text{(Equation 20)}$$

Then $$\rho = w(P - P_\infty)\eta \quad \text{(Equation 21)}$$

Equations (12) and (20) are calculated when the tit angle θ is updated. Equation (21) is calculated for each row to obtain the pixel width for the row. The value for each row can be stored or computed on the fly.

World Line Fit

A "best" straight line or curve is fit to a collection of low level marklet point detections. "Best" as used herein means that a true lane marker is better than a grind mark, paving seam, tar patch, skid mark, and the like. For painted lane markers, a marklet has the properties of width, point $(x_i, y_i)$ of the center of the one-dimensional marklet, and average intensity over the width of the marklet. Marklets are detected by scan-row in the image and inverse-perspective transformed to world coordinates. A set of marklets typically includes clutter points. In an embodiment, for lane tracking wherein a lane marker is positioned close to the vehicle and the camera/detection device, a straight line is fitted. However, a curve may be fitted as well for close lane tracking.

Hough Transform

The Hough transform is conventionally used to find straight lines based on sample measurements. For a set of P measurement points, let $x_i$ and $y_i$ be the spatial coordinates of the ith point. Each point determines the equation of a line passing through the point:

$$y_i = sx_i + b \quad \text{Equation 22}$$

where s and b are the slope and intercept of the line. As s and b vary, they describe an infinite number of possible lines that pass through the point $(x_i, y_i)$. The equation of the line can be re-written as:

$$b = y_i - sx_i \quad \text{Equation 23}$$

Equation 23 is used since, in an embodiment, the present invention seeks lines with small angles. For lines with arbitrary angles, the typical representation of line is used: x cos θ+y sin θ=ρ.

Figure 7:
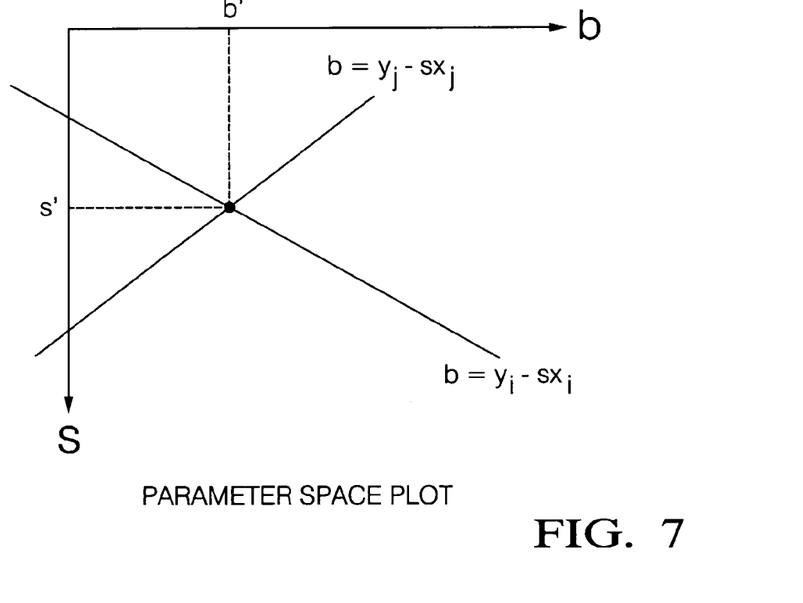
FIG. 7 is a graphical illustration of a line plotted in the sb parameter space plane as utilized in a Hough transform, in accordance with an embodiment of the present invention.
Figure 8:
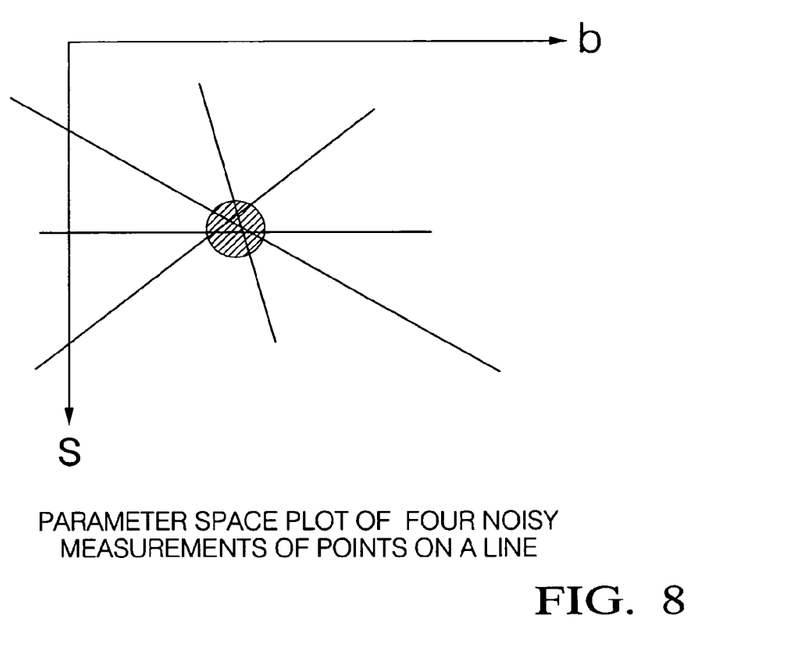
FIG. 8 is a graphical illustration of measured points having measurement noise and corresponding lines failing to intersect in a single point, in which the present invention can be useful.

FIG. 7 shows the line of Equation 23 plotted in the sb parameter space plane. The jth point also describes a line in the sb parameter space plane. The two lines in the sb parameter space intersect at the point (s', b'). All points that fall on the line defined by the points $(x_i, y_i)$ and $(x_j, y_j)$ describe lines in the sb parameter space plane that intersect in the same point, (s', b'). When the measured points have measurement noise (errors), the lines in the parameters space do not intersect in a single point, but will pair-wise intersect within a small region illustrated by the circle in FIG. 8.

Figure 9:
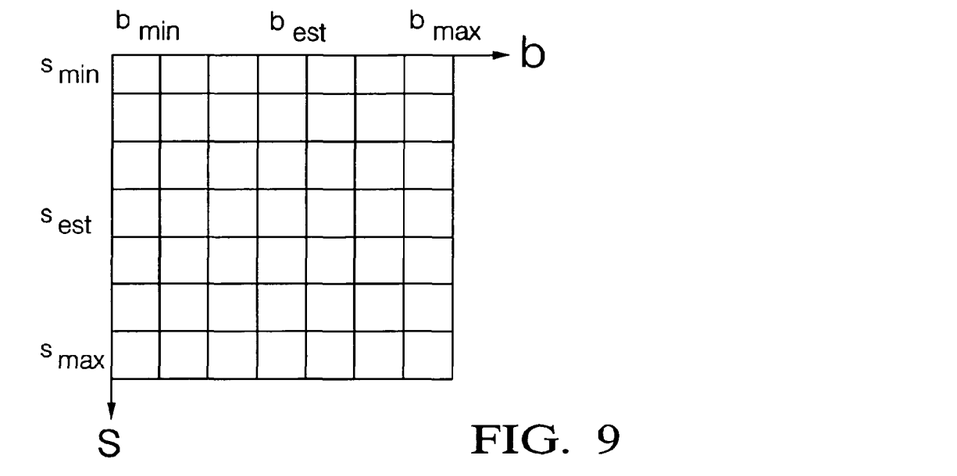
FIG. 9 is a graphical illustration of a sub-division of a parameter plane into a quantized accumulator plane, in accordance with an embodiment of the present invention.

In the Hough transform an efficient quantized approximation is implemented to the sb parameter space plane, called the accumulator plane, A. FIG. 9 illustrates the quantized accumulator plane. A(i, j) is the accumulator associated with parameters $(s_i, b_j)$; or more exactly, it is associated with all s and b values that fall within its rectangle of the parameter space.

A(i, j) is the accumulator for all s such that $$\frac{s_{i-1} + s_i}{2} < s \le \frac{s_i + s_{i+1}}{2} \quad \text{Equation 24A}$$

and b such that $$\frac{b_{j-1} + b_j}{2} < b \le \frac{b_j + b_{j+1}}{2} \quad \text{Equation 24B}$$

For each point, the slope, s, is varied in quantized steps from $s_{min}$ to $s_{max}$, and the resulting offset, b, is computed using Equation 23. b is then quantized into the closest bin between $b_{min}$ to $b_{max}$ based on Equation (24B). The value of the corresponding accumulator cell, A(i, j) is then incremented. After computing this over all the points and all slopes, accumulator cell A(i, j) with a value of $a_{ij}$, corresponds to $a_{ij}$ points lying on (near) a line with parameters $s_i$ and $b_j$. Finding the lines then corresponds to finding all the cells of A with A(i, j)≧$a_{min}$.

FIG. 9 shows an accumulator plane centered about the predicted or estimated point (s=$s_{est}$, b=$b_{est}$). The lines that are near their predicted/estimated values are to be determined. The angle parameter space is quantized in terms of a fixed, uniform, angle quantization size. The offset parameter space size varies with the quality of the track. Searching for a lane marker looks over a larger offset space (typically ±2 m), while a steady-state track looks over a smaller offset space (typically ±0.5 m). It is desirable that a steady-state track have an offset space small enough that it will not get confused by clutter, but large enough so that it does not lose track from small vehicle pitching.

The following are definitions:
M angle quantization bins
N offset quantization bins
P the number of sample points
($s_{est}$, $b_{est}$) predicted/estimated line parameters
$\theta_{range}$ region of interest±angle range
$b_{range}$ region of interest±offset range The space and quantization of the Hough accumulator plane are determined by:

$$\theta_{est} = \tan^{-1} s_{est} \quad \text{Equation 25}$$

$$\theta_{est} - \theta_{range} \le \theta \le \theta_{est} + \theta_{range}$$

$$\theta_\Delta = \frac{2\theta_{range}}{M}$$

and $$b_{est} - b_{range} \le b \le b_{est} + b_{range} \quad \text{Equation 26}$$

$$b_\Delta = \frac{2b_{range}}{N}$$

Small Angle Approximation

In lane tracking, the angle of the lane marker is usually small. For the in-scope operation of lane departure warning, the magnitude of the angle is small, |θ|<15°. An approximation of $\tan\theta \approx \theta$ or $\tan^{-1}\theta \approx \theta$ results in a worst case relative error of 2.3%, which is insignificant compared to the measurement noise.

Loop Re-ordering

The nesting order of the loops: for each angle, for each point, can be interchanged to possibly improve memory access patterns. If the small angle approximation is used, and the $\tan/\tan^{-1}$ are eliminated, then the programming code can be modified to iterate over offset instead of angle. If the number of quantized offset bins is less than the number of quantized angle bins, N<M, then iterating over offset reduces computation. However, if the "inside line" technique and the "memory minimization" technique (discussed infra) are used, the iteration must be over angle.

Quantization/Noise Issues

The number of angle quantization bins, M, and the number offset quantization bins, N, are determined based on thee factors:
1. The computational complexity of the basic Hough transform (including finding the peaks) is approximately max $\{O(MN), O(MP)\}$; reducing M and/or N reduces complexity;
2. Desired accuracy of the line measurement; accuracy will be no better than $\theta_A$ and $b_A$; and
3. The parameter quantization should be matched to the variance of point (marklet) measurements so that points belonging to the same line will have a measurement error/noise of less than $\theta_A$ and $b_A$. This assumes a constant variance for all measurement points.

Bin Split Blurring Modification

When the parameters' bin quantization are ideally chosen, some points belonging to a line will map into one accumulator cell and other points may map into adjacent accumulator cells. If $\theta_A$ and $b_A$ are not chosen appropriately, the variance of point measurements may result in mapping to a large neighborhood about the true line parameter accumulator cell, and not just to quantization splitting over the adjacent cells.

The resulting parameter measurement errors are assumed to have independent Gaussian distributions and, since $\theta_A$ and $b_A$ result in a bin normalization based on variance, the parameter errors in the accumulator plane are Gaussian and circularly symmetric. Therefore, to mitigate the effect of bin splitting, the point mass is Gaussian blurred (convolved), rather than accumulating a point mass (weight) of one in the mapped accumulator bin.

The Gaussian kernel is further approximated by a 3 by 3 weight matrix:

$$\frac{1}{16}\begin{bmatrix} 1 & 2 & 1 \\ 2 & 4 & 2 \\ 1 & 2 & 1 \end{bmatrix}$$

For performance reasons, the 1/16 weight term is dropped so that simple integer arithmetic can be used.

Bin splitting blur kernel:

$$\begin{bmatrix} 1 & 2 & 1 \\ 2 & 4 & 2 \\ 1 & 2 & 1 \end{bmatrix} \quad \text{Equation 27}$$

The blurring is implemented by convolving the kernel with the final accumulated values in A. Alternatively, the "impulse" measurement can be blurred by incrementing the neighbors by the kernel weighted values. The later is more efficient if the number of points is less than the number of accumulator bins, P<NM. The edge cases where the blur extends beyond the row/column limits of A present a unique situation. The simple expedient of not blurring on the first and last row and column of A is utilized.

Weighting Points Modification

As previously described, each marklet point measurement is assigned the same point mass, or weight. However, there are many potential reasons to weight each point differently, and assign "better" points and higher weights to find the "best line."

Perspective Weighting

All marklet points are situated on the ground plane of a camera perspective image. There are many more image rows per meter of the world for near marklet detections than for far marklet detections. For a solid line painted marker, in an embodiment, one marklet is detected per image row over the region of interest.

Tilt only perspective transform from world (x, y) to image (p, q) coordinates:
x longitudinal distance (m)
y lateral distance (m)
p row (relative to image center) (pixel)
q column (relative to image center) (pixel)

Camera parameters:
f focal length (pixels)
h camera height (m)
$\phi$ tilt down angle (radians)

The following world to image transformation is applied:

$$p = f\frac{x\sin\varphi - h\cos\varphi}{x\cos\varphi + h\sin\varphi} \quad \text{Equation 28}$$

$$q = f\frac{y}{x\cos\varphi + h\sin\varphi}$$

The marklet density (image rows/meter) is estimated by the derivative:

$$\frac{dp}{dx} = f\frac{\sin\varphi(x\cos\varphi + h\sin\varphi) - \cos\varphi(x\sin\varphi - h\cos\varphi)}{(x\cos\varphi + h\sin\varphi)^2} \quad \text{Equation 29}$$

This is approximated by:

$$\frac{dp}{dx} \approx \frac{hf}{x^2} \quad \text{Equation 30}$$

To avoid line fits that are heavily weighted towards marklets that are near the camera, the contribution of each marklet is weighted to the line (curve) fit. Possible fits are:
1. all marklets weighted equally, $w_i=1$
2. marklets weighted by linear distance, $w_i=x_i$
3. marklets weighted by squared distance, $w_i=x_i^2$ It is to be appreciated that item 3 corresponds to weighting by inverse density (refer to equation 30). This weighting provides uniform weighting in world coordinates of marklets sampled in the perspective image coordinates. Experimentally, in an embodiment, item 2, by linear distance results in the best line fits. Analytical models of the presumed measurement errors imply that the uniform weight is optimal. The experimental results with real world data obtain the best result with the linear distance weight.

Other Weightings

In an embodiment, detection of the best "lane marker," and not the best line, is made and so characteristics of lane markers can be incorporated into the weightings. Lane markers are usually brighter than the road, tar patching, tire skid marks, etc. Thus, brighter marklets should be weighted heavier. However, this is not a completely valid assumption when shadows are present. Nominal width markers (about 12 cm) are more common than wide markers. Thus, nominal width marklets are weighted heavier. The variance of the width of the marklets belonging to a true marker should be low. Thus, low variance lines are weighted heavier. The present invention accommodates multiple weighting through a multi-plane extension of the Hough transform.

Multi-plane Hough Transform

In using the Hough plane to select the "best" line, in an embodiment, preference for certain line characteristics is expressed. This method applies the notion that lines having these preferred characteristics are more likely to be real lane markers rather than false, clutter-related lines. For example, it is expected that a real lane marker results in detected marklets that have approximately the same width. A preference is expressed for lines that result from groups of marklets having a small variance in width. Similarly, there are fairly standard widths for lane markings, many of which have a width around 10-12 cm. Although much wider lane markings do occur, a preference is expressed for 'nominal' width lines by looking at the mean width of the marklets contributing to that line. Other preferences include a small residual (i.e., the candidate line is close in slope and offset to the tracker's prediction), a slope near zero (i.e., the line is nearly parallel to the host vehicle's direction of motion), and a high mean intensity (i.e., brighter lines are better).

The quantities mentioned above can be calculated for a given line. However, the present invention further expresses all preferences prior to selection of a best line. The approach employed here modifies the accumulated values in the Hough plane bins. For each type of preferred line characteristic, there may be an auxiliary plane of bins whose structure corresponds to the main Hough plane (i.e., for each bin in the Hough plane there is a corresponding bin in each of the auxiliary planes). Each bin in this auxiliary plane contains a value representing that characteristic of the line corresponding to that bin (calculated from the marklets that contributed to that bin). A number between zero and one, which is a multiplicative penalty reflecting the extent to which that particular preference is not satisfied, is subsequently calculated for each bin in the auxiliary plane. The greater the extent to which the preference is not satisfied, the closer the penalty factor is to zero.

The way that the original Hough plane values are modified to account for the preferences is, for each bin, to multiply the original accumulated value cell-wise by all of the penalty factors from the corresponding bins in the auxiliary planes. For example, there may be five auxiliary planes such as residual error, slope near zero, mean width, variance of width, and mean intensity. A particular bin in the Hough plane has an accumulated value of 300, and the corresponding bin in each of the 5 auxiliary planes generates penalty values 0.9, 0.95, 0.7, 0.85 and 0.9, respectively. The corresponding bin in the modified Hough plane (which accounts for the preferred line characteristics) will take the value 300 times 0.9 times 0.95 times 0.7 times 0.85 times 0.9=137.36.

As values are accumulated in the main Hough plane, data is also accumulated in the corresponding bins in the auxiliary planes, which allow a post-processing step to calculate the appropriate line characteristics (e.g., width variance) and subsequently the corresponding penalty values.

The residual error and slope near zero terms do not require additional Hough planes, they are functions of the position (indices) in the parameters space and can be directly computed as part of the mass weight plane or in the post processing step of cell-wise combining the planes. The auxiliary planes are only needed to accommodate weighting terms that can not be determined until all the points have been mapped to bins. In this case, means and variance terms require separate planes because the mean and variance are not determined until all the points mapped to a bin are known. The mean and variance terms are implemented by computing four auxiliary planes: 1) the count of points mapped to the bin, 2) sum of intensity plane, 3) sum of width plane, and 4) square of width plane. Also, the auxiliary planes are blurred in the same way that the main Hough plane is blurred.

Penalty Functions

Figure 10:
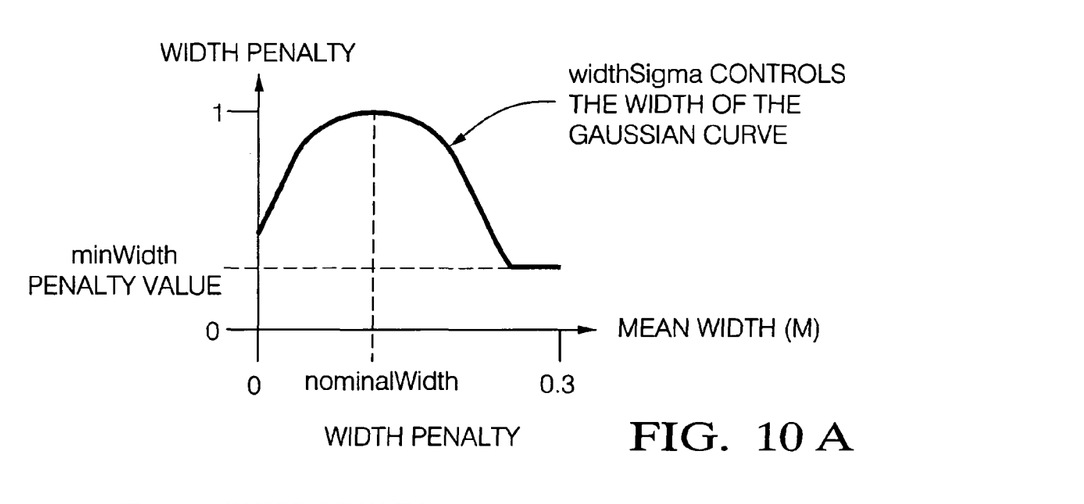
FIG. 10A is a graphical illustration of width penalty characteristic, illustrating how the real-valued characteristic maps into a penalty value between zero and one, in accordance with an embodiment of the present invention.
FIG. 10B is a graphical illustration of width variance penalty characteristic, illustrating how the real-valued characteristic maps into a penalty value between zero and one, in accordance with an embodiment of the present invention.
FIG. 10C is a graphical illustration of mean intensity penalty function, illustrating how the real-valued characteristic maps into a penalty value between zero and one, in accordance with an embodiment of the present invention.
FIG. 10D is a graphical illustration of offset residual penalty function, which is a product of two penalty functions, namely, the slope residual penalty function and the offset residual penalty function, illustrating how the real-valued characteristic maps into a penalty value between zero and one, in accordance with an embodiment of the present invention.

The present invention converts line characteristics (e.g., width variance) data stored in the auxiliary planes into penalties. For each characteristic, a plot is shown illustrating how the real-valued characteristic maps into a penalty value between zero and one. As illustrated in FIG. 10A, for the "mean width" characteristic, the penalty function is a Gaussian curve centered at the nominal marker width nominalWidth, and clipped to not return a penalty value smaller than minWidthPenaltyValue. The horizontal width of the Gaussian curve is adjusted using widthSigma. As illustrated in FIG. 10B, for the "width variance" characteristic, the penalty function decreases exponentially from a value of one at zero variance, and is clipped to not return a penalty value smaller than minVarPenaltyValue. The rate of descent of the exponential curve is adjustable. The exponential function of variance is meant to mimic (half of) a Gaussian curve in standard deviation. As illustrated in FIG. 10C, the "mean intensity" penalty function has a straight-line shape which passes through 1 at the maximum intensity of 255, and is controlled by a single parameter which determines the penalty where the intensity is zero. As illustrated in FIG. 10D, the "residual error" penalty function is the product of two penalty functions: (1) the slope residual penalty function; and (2) the offset residual penalty function. Each of these two penalty functions has a piecewise-linear shape which passes through 1 at zero residual, and drops to a specified minimum value (e.g., minOffsetResPenalty) at a specified residual value (e.g., offsetDiffForMaxPenalty).

Locating Peaks In The Parameter Space/Best Line

Multiple Lane Markers

Figure 11:
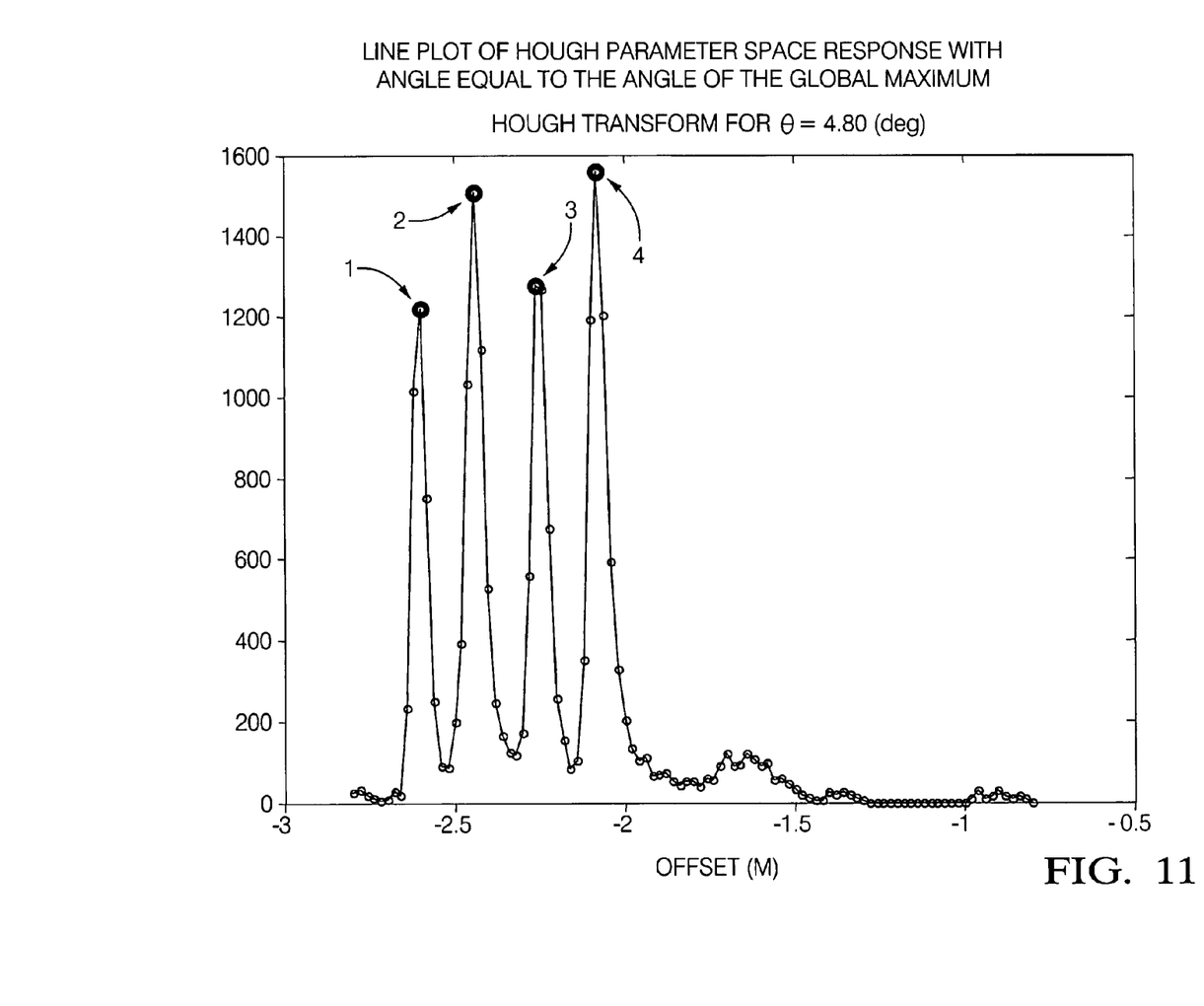
FIG. 11 is a graphical illustration of a line plot of Hough parameter space response with the angle equal to the angle of the global maximum, and showing a peak corresponding to an inside marker, in accordance with an embodiment of the present invention.

To manage the case of multiple lane markers, i.e. double solid, solid dashed, etc., the inside lane marker (the marker closest to the host vehicle) is located. It is to be appreciated that multiple lane markers of two through five parallel markers are used on roadways. To find the inside lane marker in the case of multiple markers, the multiple markers are taken as parallel (having the same angle). A search is conducted from the global maximum in the parameter space along the line of decreasing offset towards the host vehicle, with the slope/ heading angle of the global best lane marker constant, looking for local peaks. Local peaks, as discussed supra, are defined by a five-point neighborhood centered about the current point. Experimental results show that, in some cases, a three-point neighborhood tends to generate false local peaks. If the local peak has a magnitude above threshold, it is accepted. The innermost local peak above threshold is the inside lane marker's world line fit. FIG. 11 shows a line plot of Hough parameter space response with angle equal to the angle of the global maximum. Circles 1, 2 and 3 are peak in the Hough plane, circle 4 is the peak corresponding to the inside marker.

Minimizing Memory

In an embodiment, the present invention significantly reduces the memory requirements of the Hough parameter space plane. By combining the location of the global maximum with the calculation of the Hough parameter space plane, the parameter space planes can be reduced in size from M by N to the size 4 by N, assuming a three by three blurring kernel. One row is used to hold the current best row, and three rows are used with circular addressing to hold the current row, the previous row, and the next row.

Quality of Line Fit

In defining a quality measure of the resulting line, the quality of the line fit increases as: the number of points on the line increases; the clutter ratio of points on the line to points not on the line increases; the range extent of points on the line increases; and variance of the marklet width of points on the line decreases. The definition herein of "quality measure of the resulting line" construes "on the line" to also mean "near the line" to accommodate measurement errors and quantization of the Hough parameter space. The present invention improves on the Hough transform to provide a mechanism to manage range dependent measurement errors in the marklet detections. Although errors introduced by errors in a camera's pan, tilt, and roll angle estimates will change the absolute world coordinates of a line fit, the perspective transform still maps an image straight line to a world straight line. A source of error for a straight line fit for marklet detections, which belong to true lane markers, are horizontal and vertical curvature. The straight line and flat world is less susceptible to gross modeling errors than higher order models and performs satisfactorily for lane departure warning. A lane marker may actually be curved, not a straight line, and the ground might not be flat. If the lane marker has a non-zero constant curvature, the measurement errors increase as the square of the range. However, most of the time the lane marker is a straight line, the world is flat (meaning having a constant inclination), and the relative measurement error is roughly constant.

In an embodiment, straight lines are being fitted and the curvature of the lane marker is unknown. Thus, the present invention determines a geometric mean of a range independent measurement variance and a range squared measurement variance, and employs a linear or range weighted variance. Given the near threshold $\lambda$ (typically 2 cm at 5 m), a point i is defined to be on the line if the distance between the point $(x_i, y_i)$, and the line $y=s_{inside}x+b_{inside}$ is less than or equal to $\lambda x$.

If $$\frac{|y_i - s_{inside}x_i - b_{inside}|}{\sqrt{s_{inside}^2 + 1}} \leq \lambda x_i,$$

then the point i is on the line.

Given the set of points determined to be "on the line" a weighted least squares line fit is then computed to produce the refined line fit estimate.

The score of the line fit is the number of points on the line. The clutter ratio of the line fit is the score divided by the number of points. Another measure of clutter ratio is the score divided by (number of points minus number of points on parallel multiple lane markers). However, this requires determining the points that are near multiple lines. The support is the range extent $(\max\{x_i\}-\min\{x_i\})$ of points, i, on the line. The width standard deviation is the unbiased standard deviation of the marklet widths of points on the line. The biased estimator may also be used for raised pavement marker detection mode.

Other features and advantages of this invention will be apparent to a person of skill in the art who studies this disclosure. Thus, exemplary embodiments, modifications and variations may be made to the disclosed embodiments while remaining within the spirit and scope of the invention as defined by the appended claims.

We claim:

1. A vehicle-based lane tracking device including a processing system configured to receive optical images of a roadway adjacent the vehicle, to process said images and to output vehicle control signals in response thereto, said system operative to perform process steps, comprising:

modeling the lane marker by the system, in the range of a minimum predetermined lane marker width to a maximum predetermined lane marker width;

splitting the lane marker model into a left step and a right step by the system, wherein the right step has a negative value of a left step value;

calculating a cumulative sum ($S_k$) from the lane marker model by the system, wherein k is a kth pixel;

calculating a filter response from the cumulative sum by the system; and normalizing the filter response by the system comprising compensating for at least one of filter pixel scale size and illumination, wherein compensating for illumination comprises normalizing for illumination by apparent brightness of the lane marker and apparent brightness of a road on which the lane marker is located, wherein normalizing for the brightness of the lane marker comprises dividing the normalized filter response by a bright section measurement of the filter response to obtain an illumination normalized response ($Z_k$) by the system, and further comprising detecting a threshold peak from the lane marker model by the system to find an edge of the lane marker, wherein the threshold peak is at least one of a positive peak and a negative peak, wherein the threshold peak is detected when $|Z_k| > \tau_1(f_{bright_k})$ and $f_{bright_k} > \tau_2(w_k)$, wherein $f_{bright_k} = \max(f_{right_k}, f_{left_k})$, wherein $\tau_1(f_{bright_k})$ and $\tau_2(w_k)$ are set to predetermined values, and wherein $w_k$ is an observed road brightness, and wherein the threshold peak is further defined by a five-point neighborhood centered about a current point requiring $Z_{k-2} < Z_k$ and $Z_{k-1} \leq Z_k$ and $Z_{k+1} \leq Z_k$ and $Z_{k+2} < Z_k$
when $z > 0$, and $Z_{k-2} > Z_k$ and $Z_{k-2} \geq Z_k$ and
$Z_{k+1} \geq Z_k$ and $Z_{k+2} > Z_k$ when $Z < 0$.

2. A vehicle-based lane tracking device including a processing system configured to receive optical images of a roadway adjacent the vehicle, to process said images and to output vehicle control signals in response thereto, said system operative to perform process steps, comprising:

modeling the lane marker by the system, in the range of a minimum predetermined lane marker width to a maximum predetermined lane marker width;

splitting the lane marker model into a left step and a right step by the system, wherein the right step has a negative value of a left step value;

calculating a cumulative sum ($S_k$) from the lane marker model by the system, wherein k is a kth pixel;

calculating a filter response from the cumulative sum by the system; and normalizing the filter response by the system comprising compensating for at least one of filter pixel scale size and illumination, wherein compensating for illumination comprises normalizing for illumination by apparent brightness of the lane marker and apparent brightness of a road on which the lane marker is located, wherein normalizing for the brightness of the road comprises calculating an observed road brightness ($W_k$) by the system wherein if column k is less than a center column index of a focus of expansion then $$w_k = \frac{s_{k+L_{inside}} - s_{k+L_{max}}}{L_{inside} - L_{max}},$$

otherwise $$w_k = \frac{s_{k-L_{max}} - s_{k-L_{inside}}}{L_{inside} - L_{max}},$$

wherein $L_{inside}$ is a predetermined width from an outer edge of the lane marker toward an image center, and $L_{max}$ is a filter pixel scale width of a maximum real world width of the lane marker.

3. The method as in claim 2, further comprising detecting a threshold peak from the lane marker model to find an edge of the lane marker by the system, wherein the threshold peak is at least one of a positive peak and a negative peak, wherein the threshold peak is detected when $|Z_k| > \tau_1(f_{bright_k})$ and $f_{bright_k} > \tau_2(w_k)$, wherein $f_{bright_k} = \max(f_{right_k}, f_{left_k})$, wherein $\tau_1(f_{bright_k})$ and $\tau_2(w_k)$ are set to predetermined values, and wherein $Z_k$ is an illumination normalized response, calculated by dividing the normalized filter response by a bright section measurement of the filter response by the system.

4. The method as in claim 3, wherein $$\tau_1(f_{bright_k}) \equiv \min\left(13\left(1 + \frac{255 - f_{bright_k}}{255}\right), 0.3 f_{bright_k}\right)$$

and $\tau_2(w_k) \equiv \min(1.05 w_k, 250)$.

5. The method as in claim 3, wherein the threshold peak is further defined by a five-point neighborhood centered about a current point requiring $Z_{k-2} < Z_k$ and $Z_{k-1} \leq Z_k$ and $Z_{k+1} \leq Z_k$ and $Z_{k+2} < Z_k$ when $z > 0$, and $Z_{k-2} > Z_k$ and $Z_{k-1} \geq Z_k$ and $Z_{k+1} \geq Z_k$ and $Z_{k+2} > Z_k$ when $Z \leq 0$.

6. A vehicle-based lane tracking device including a processing system configured to receive optical images of a roadway adjacent the vehicle, to process said images and to output vehicle control signals in response thereto, said system operative to perform process steps, comprising:

modeling the lane marker by the system, in the range of a minimum predetermined lane marker width to a maximum predetermined lane marker width;

splitting the lane marker model into a left step and a right step by the system, wherein the right step has a negative value of a left step value;

calculating a cumulative sum ($S_k$) from the lane marker model by the system, wherein k is a kth pixel;

calculating a filter response from the cumulative sum by the system; and normalizing the filter response by the system comprising compensating for at least one of filter pixel scale size and illumination, wherein compensating for illumination comprises normalizing for illumination by apparent brightness of the lane marker and apparent brightness of a road on which the lane marker is located;

scanning for a first left edge peak by the system;

scanning for a first right edge peak from the minimum predetermined lane marker width distance to the maximum predetermined lane marker width distance, measured from the first left edge peak by the system;

defining a first marklet position midway between the first left edge peak and the first right edge peak by the system; and scanning, beyond the first left edge peak, for an alternate left edge peak when the first right edge peak is not found by the system, and then scanning for an alternate right edge peak from the minimum predetermined lane marker width distance to the maximum predetermined lane marker width distance, measured from the alternate left edge peak by the system, and defining an alternate marklet position midway between the alternate left edge peak and the alternate right edge peak by the system, wherein the lane marker is modeled by at least one of row, column, one-dimension, two dimensions, consecutively, and non-consecutively;

scanning, beyond the first right edge peak, for a second left edge peak, when a first left edge peak, a first right edge peak and a first marklet position are found by the system;

scanning for a second right edge peak from the minimum predetermined lane marker width distance to the maximum predetermined lane marker width distance, measured from the second left edge peak by the system; and defining a second marklet position midway between the second left edge peak and the second right edge peak by the system, wherein the scanning for the second left edge peak, the scanning for the second right edge peak, and the defining the second marklet position are iterative to define a subsequent marklet position.

7. A vehicle-based lane tracking device including a processing system configured to receive optical images of a roadway adjacent the vehicle, to process said images and to output vehicle control signals in response thereto, said system operative to perform process steps, comprising:

modeling the lane marker, in the range of a minimum predetermined lane marker width to a maximum predetermined lane marker width by the system;

splitting the lane marker model into a left step and a right step by the system, wherein the right step has a negative value of a left step value;

calculating a cumulative sum ($S_k$) from the lane marker model by the system, wherein k is a kth pixel;

calculating a filter response from the cumulative sum by the system; and normalizing the filter response by the system comprising compensating for at least one of filter pixel scale size and illumination, wherein compensating for illumination comprises normalizing for illumination by apparent brightness of the lane marker and apparent brightness of a road on which the lane marker is located;

scanning for a current position left edge peak by the system;

scanning for at least one first left edge peak until a first right edge peak is detected by the system;

determining a first left edge maximum illumination normalized response magnitude (first maximal left edge) from the at least one first left edge peak by the system;

scanning for at least one first right edge peak, from the minimum predetermined lane marker width distance to the maximum predetermined lane marker width distance, measured from the first maximal left edge by the system;

determining a first right edge maximum illumination normalized response magnitude (first maximal right edge) from the at least one first right edge peak by the system;

defining a first marklet position midway between the first maximal left edge and the first maximal right edge by the system; and when the first right edge peak is not detected, scanning, beyond the first maximal left edge, for at least one alternate left edge peak until a right edge peak is detected by the system, and then scanning for at least one alternate right edge peak from the minimum predetermined lane marker width distance to the maximum predetermined lane marker width distance, measured from a determined alternate maximal left edge by the system, wherein the lane marker is modeled by at least one of row, column, one-dimension, two dimensions, consecutively, and non-consecutively, scanning, beyond the first maximal right edge peak by the system, for at least one second left edge peak until a second right edge peak is detected by the system, when a first left edge peak, a first right edge peak and a first marklet position are detected by the system;

determining a second left edge maximum illumination normalized response magnitude (second maximal left edge) from the at least one second left edge peak by the system;

scanning for at least one second right edge peak, from the minimum predetermined lane marker width distance to the maximum predetermined lane marker width distance, measured from the second maximal left edge by the system;

determining a second right edge maximum illumination normalized response magnitude (second maximal right edge) from the at least one second right edge peak by the system; and defining a second marklet position midway between the second maximal left edge and the second maximal right edge by the system, wherein the scanning for the second left edge peak, the scanning for the second right edge peak, and the defining the second marklet position are iterative to define a subsequent marklet position.

8. A vehicle-based lane tracking device including a processing system configured to receive optical images of a roadway adjacent the vehicle, to process said images and to output vehicle control signals in response thereto, said system operative to perform process steps, comprising:

modeling the lane marker, in the range of a minimum lane marker width to a maximum lane marker width by the system;

splitting the lane marker model into a left step and a right step by the system, wherein the right step has a negative value of a left step value;

calculating a cumulative sum ($S_k$) from the lane marker model by the system, wherein k is a kth pixel;

calculating a filter response from the cumulative sum by the system; and normalizing the filter response by the system comprising compensating for filter pixel scale size and illumination, wherein compensating for illumination comprises normalizing for illumination by apparent brightness of a road on which the lane marker is located, wherein normalizing for the brightness of the road comprises calculating an observed road brightness ($W_k$) by the system wherein if column k is less than a center column index of a focus of expansion then $$w_k = \frac{S_{k+L_{inside}} - S_{k+L_{max}}}{L_{inside} - L_{max}},$$

otherwise $$w_k = \frac{S_{k-L_{max}} - S_{k-L_{inside}}}{L_{inside} - L_{max}},$$

wherein $L_{inside}$ is a predetermined width from an outer edge of the lane marker toward an image center, and $L_{max}$ is a filter pixel scale width of a maximum real world width of the lane marker.

9. The method as in claim 8, further comprising detecting a threshold peak from the lane marker model to find an edge of the lane marker by the system, wherein the threshold peak is at least one of a positive peak and a negative peak, wherein the threshold peak is detected when $$|z_k| > \tau_1(f_{bright_k}) \text{ and } f_{bright_k} > \tau_2(w_k),$$

wherein $f_{bright_k} = \max(f_{right_k}, f_{left_k})$, wherein $\tau_1(f_{brightk})$ and $\tau_2(w_k)$ are set to predetermined values, and wherein $Z_k$ is an illumination normalized response, calculated by dividing the normalized filter response by a bright section measurement of the filter response by the system.

10. The method as in claim 9, wherein the threshold peak further requires:

$Z_{k-2} < Z_k$ and $Z_{k-1} \leq Z_k$ and $Z_{k+1} \leq Z_k$ and $Z_{k+2} < Z_k$ when $z > 0$, and $Z_{k-2} > Z_k$ and $Z_{k-1} \geq Z_k$ and $Z_{k+1} \geq Z_k$ and $Z_{k+2} > Z_k$ when $Z \leq 0$.

11. A method of fitting a parametric model to a point detection using a vehicle-based lane tracking device including a processing system configured to receive optical images of a roadway adjacent the vehicle, to process said images and to output vehicle control signals in response thereto, said system operative to perform process steps, comprising:

utilizing a Hough transform by the system to determine a line; and extending the Hough transform from parametric model fitting from a single Hough plane to multiple planes used by the system to allow a quality of a line fit measure to include characteristics based on a set of points that map to an accumulator cell by the system, wherein the line is a lane marker for directing motor vehicle travel, and wherein the step of extending the Hough transform to multiple planes is performed by the system prior to a selection of a best line by the system, wherein accumulated values in a Hough plane bin are modified by the system to account for a preferred lane marker feature.

12. The method as in claim 11, wherein the step of extending the Hough transform from parametric model fitting using the single Hough plane to further include the multiple Hough planes further includes the system using a lane marker feature having at least one of a mean and a variance of at least one of,
   (i) lane marker brightness,
   (ii) lane marker width,
   (iii) lane marker parallelism to a host vehicle direction of travel, and
   (iv) consistence with a predicted lane marker characteristic.

13. The method as in claim 11, wherein modifying the Hough plane bin by the system comprises:
   generating a value in an auxiliary plane bin to the Hough plane bin by the system, wherein the value represents a characteristic of the lane marker;
   assigning a penalty factor to the auxiliary plane bin reflecting an extent to which the auxiliary plane bin value varies from the preferred lane marker feature by the system; and
   multiplying the penalty factor to the Hough plane bin to generate a modified Hough plane bin by the system.

14. A method of fitting a parametric model to a point detection using a vehicle-based lane tracking device including a processing system configured to receive optical images of a roadway adjacent the vehicle, to process said images and to output vehicle control signals in response thereto, said system operative to perform process steps, comprising:
   utilizing a Hough transform by the system to determine a line by the system;
   extending the Hough transform from parametric model fitting from a single Hough plane to multiple planes used by the system to allow a quality of a line fit measure to include characteristics based on a set of points that map to an accumulator cell by the system, wherein the line is a lane marker for directing motor vehicle travel;
   determining a refitted lane marker line to account for at least one of a vertical curvature and a horizontal curvature of the lane marker line by the system, including,
   comparing the Hough transform lane marker line to points used by the Hough transform by the system, wherein a point i, used by the Hough transform, is on the refitted lane marker line $$\text{if } \frac{|y_i - s_{inside}x_i - b_{inside}|}{\sqrt{s_{inside}^2 + 1}} \leq \lambda x_i$$

wherein $y = S_{inside}x + b_{inside}$ is an equation of a line passing through $x_i$, and $y_i$, $x_i$ and $y_i$ are spatial coordinates of the ith point, s and b are a slope and an intercept of the line, and $\lambda x$ is a predetermined threshold error; and
   computing a weighted least squares line fit by the system, utilizing the points on the refitted lane marker line.

15. A method of identifying a closest lane marker line to a host vehicle from a plurality of lane marker lines being situated adjacent to the host vehicle using a vehicle-based lane tracking device including a processing system configured to receive optical images of a roadway adjacent the vehicle, to process said images and to output vehicle control signals in response thereto, said system operative to perform process steps, comprising:
   locating a global maximum lane marker line in a Hough transform parameter space by the system;
   performing a one-dimensional search in the Hough transform parameter space to search for a closest lane marker line adjacent to the host vehicle among the plurality of lane marker lines by the system, by searching a path from a point in the Hough transform parameter space with the global maximum lane marker line, along a path of decreasing offset towards the host vehicle and in combination with at least one of a slope and a heading angle of a global best maximum lane marker, to identify local peaks of parallel lane markers which have a slope equal to the slope of the global best maximum lane marker line by the system; and
   identifying a local peak situated closest to the host vehicle by the system, from the local peaks having the slope equal to the slope of the global maximum lane marker line by the system.

16. The method as in claim 15, wherein performing the one-dimensional search further comprises performing the one-dimensional line search in the path of decreasing offset towards the host vehicle, over a maximum predetermined distance from the host vehicle by the system.

17. The method as in claim 15, wherein the global maximum lane marker line is located by,
   modeling a lane marker by the system, in the range of a minimum lane marker width to a maximum lane marker width;
   splitting the lane marker model into a left step and a right step by the system, wherein the right step has a negative value of a left step value;
   calculating a cumulative sum ($S_k$) from the lane marker model by the system, wherein k is a kth pixel;
   calculating a filter response from the cumulative sum by the system;
   normalizing the filter response by the system comprising compensating for filter pixel scale size and normalizing by apparent brightness of the lane marker by dividing the normalized filter response by a bright section measurement of the filter response to obtain an illumination normalized response ($Z_k$); and
   determining the illumination normalized response having a maximum magnitude by the system.

18. A method of identifying a closest lane marker line to a host vehicle from a plurality of lane marker lines being situated adjacent to the host vehicle using a vehicle-based lane tracking device including a processing system configured to receive optical images of a roadway adjacent the vehicle, to process said images and to output vehicle control signals in response thereto, said system operative to perform process steps, comprising:
   locating a global maximum lane marker line in a Hough transform parameter space by the system;
   performing a line search between the global maximum lane marker line and the host vehicle by the system, identifying local peaks having a slope equal to the slope of the global maximum lane marker line by the system; and
   identifying a local peak situated closest to the host vehicle by the system, from the local peaks having a slope equal to the slope of the global maximum lane marker line by the system, wherein the global maximum lane marker line is located by:

modeling a lane marker, in the range of a minimum lane marker width to a maximum lane marker width by the system;

splitting the lane marker model into a left step and a right step by the system, wherein the right step has a negative value of a left step value;

calculating a cumulative sum ($S_k$) from the lane marker model by the system, wherein k is a kth pixel;

calculating a filter response from the cumulative sum by the system;

normalizing the filter response by the system comprising compensating for filter pixel scale size and normalizing by apparent brightness of the lane marker by dividing the normalized filter response by a bright section measurement of the filter response to obtain an illumination normalized response ($Z_k$) by the system; and determining the illumination normalized response having a maximum magnitude by the system, wherein the local peaks require $Z_{k-2}<Z_k$ and $Z_{k-1} \leqq Z_k$ and $Z_{k+1}<Z_k$ and $Z_{k+2}<Z_k$ when $z>0$, and $Z_{k-2}>Z_k$ and $Z_{k-1} Z_k$ and $Z_{k+1} Z_k$ and $Z_{k+2}>Z_k$ when $Z \leqq 0$.

19. A method of fitting a parametric model to a point detection using a vehicle-based lane tracking device including a processing system configured to receive optical images of a roadway adjacent the vehicle, to process said images and to output vehicle control signals in response thereto, said system operative to perform process steps, comprising:

utilizing a Hough transform by the system to determine a line; and extending the Hough transform from parametric model fitting using a single Hough plane to further include a plurality of Hough planes used by the system to determine a quality of a line fit, and each Hough plane in the plurality of Hough planes defines a characteristic of the line, said characteristic being based on a set of points that map to an accumulator cell associated with each Hough plane in the plurality of Hough planes, wherein the step of extending the Hough transform from parametric model fitting using the single Hough plane to further include the plurality of Hough planes also further includes, the plurality of Hough planes comprising bins and including a main Hough plane and auxiliary Hough planes, and the bins in each auxiliary Hough plane being mapped to corresponding bins in the main Hough plane.

20. The method as in claim 19, wherein each bin in each auxiliary Hough plane comprises a penalty value associated with marklets that contribute to the respective bin, said penalty value being between zero and one, whereby when said penalty factor is closer to zero a preference associated with each bin is not satisfied.

21. The method as in claim 19, wherein the characteristics of the line associated with the auxiliary Hough planes include at least one of, (i) residual error,
(ii) slope near zero,
(iii) mean width,
(iv) variance of width, and
(v) mean intensity.

* * * * *